United States Patent Office.

SARAH A. L. HARDINGE, OF BROOKLYN, NEW YORK.

Letters Patent No. 85,584, dated January 5, 1869.

MODE OF FINISHING PHOTOGRAPHS, &c.

The Schedule referred to in these Letters Patent and making part of the same.

*To all whom it may concern:*

Be it known that I, SARAH A. L. HARDINGE, of Brooklyn, in the county of Kings, and State of New York, have invented a new and useful Improvement in Finishing Pictures; and I do hereby declare that the following is a full, clear, and exact description thereof, which will enable others skilled in the art to make and use the same.

This invention consists in the employment, in combination with the surfaces of photographic prints, lithographic prints, wood-cut prints, engravings, and all kinds of pictures, whether upon paper or other material, of a translucent sheet or film, such as wax, upon which film the inks or pigments used in coloring or finishing the picture are laid.

In carrying out my invention, I take any ordinary print or picture, as, for example, a photographic print, and upon the face thereof I place a sheet of ordinary white wax, sufficiently thin to be so translucent, that, when the wax is in close contact with the picture, the principal outlines thereof can be discerned through the wax. I then carefully press the wax-film into close contact with the surface of the picture, either by handpressure, or by means of a roller, or by passing the picture through a roller-press, or other suitable press. In order to apply the necessary pressure, I cover the surface of the wax with fine paper. The application of suitable pressure serves to harden and condense the wax, making an excellent surface for the reception of inks and colors.

The translucent film of wax thus applied will adhere very closely to the surface of the picture, which is then to be finished up by laying upon the film any suitable inks or colors that may be desired for the finishing of the picture, such as oil-colors, water-colors, India ink, &c.

One of the peculiar advantages of my improvement is, that the harsh lines and defects of the picture are more or less covered or softened, while the general effects of the lights and shades are blended and improved. This renders the use of my invention especially advantageous in connection with miniature-coloring, as the skilled artist is enabled to preserve completely the original likeness, and yet, with a comparatively small expenditure of time, to produce the most charming and exquisite effects by stippling and coloring.

The facility with which the background of the picture may be altered, lightened, when too dark, by the application of white colors, or darkened with dark colors, when too light, or otherwise artistically changed, will be obvious.

Alterations and corrections in the picture may also be readily effected. In case of accidental injury to the surface of the picture, it may be easily repaired or renewed.

The border of the translucent film may be embossed with any suitable ornamental configuration.

In other examples, where the picture consists of a profile, or other marked figure, the translucent material, after being applied upon the surface of the picture, may be traced with a needle or pointed instrument around the form of the profile, and all of the film, except that directly upon the profile, may be removed, and the edges of the film then levelled down to the background.

In this way the film-covered portion of the picture, when colored up and finished, will appear to stand out in relief, forming a medallion-picture of very beautiful appearance.

In the general use of my improvement, the artist is enabled to produce accurate life-like colors and effects, with a facility which results from no other process with which I am acquainted.

The use of the film herein described serves also to preserve the original picture from fading, and prevent it from injury from moisture and atmospheric changes.

Having thus described my invention,

What I claim as new, and desire to secure by Letters Patent, is—

The employment of the translucent sheet or film of wax, spread over and pressed upon the surface of the picture, substantially as set forth, for the purpose specified.

The above specification of my invention signed by me, this 24th day of August, 1868.

SARAH A. L. HARDINGE.

Witnesses:
FRANK BLOCKLEY,
W. H. H. GRAVES.